(12) United States Patent
O'Lenick, Jr. et al.

(10) Patent No.: US 7,279,503 B1
(45) Date of Patent: Oct. 9, 2007

(54) WATER IN OIL EMULSIONS

(75) Inventors: Anthony J. O'Lenick, Jr., Dacula, GA (US); Richard O. Vrckovnik, Toronto (CA)

(73) Assignee: Siltech LLC, Dacula, GA (US)

( * ) Notice: Subject to any disclaimer, the term of this patent is extended or adjusted under 35 U.S.C. 154(b) by 367 days.

(21) Appl. No.: 10/978,094

(22) Filed: Nov. 2, 2004

(51) Int. Cl.
*B01F 3/08* (2006.01)
*B01F 17/54* (2006.01)
*C08L 83/12* (2006.01)
*C07F 7/08* (2006.01)
*C08G 77/46* (2006.01)

(52) U.S. Cl. .................. 516/23; 524/588; 556/445; 528/29; 516/906

(58) Field of Classification Search .......... 516/23, 516/906; 524/588; 528/29; 556/445
See application file for complete search history.

(56) References Cited

U.S. PATENT DOCUMENTS

| | | | |
|---|---|---|---|
| 4,698,178 A | 10/1987 | Huttinger et al. | |
| 4,720,353 A * | 1/1988 | Bell | 516/23 |
| 5,104,998 A * | 4/1992 | Ichinohe | 556/445 |
| 5,401,870 A * | 3/1995 | Raleigh et al. | 556/445 |
| 5,451,692 A * | 9/1995 | Raleigh et al. | 556/445 |
| 5,955,003 A * | 9/1999 | Terren et al. | 516/23 |
| 6,607,734 B1 * | 8/2003 | Afriat | 514/937 |

OTHER PUBLICATIONS

Derwent Abstract on EAST, week 198615, London: Derwent Publications Ltd., AN 1986-094946, DE 3436177 A, (Goldchmidt AG TH), abstract.*

* cited by examiner

*Primary Examiner*—Daniel S. Metzmaier

(57) ABSTRACT

The invention relates to emulsions of the W/O (water/oil) type made using specific emulsifiers and oils selected from silicone oil, mineral oil and combinations thereof. Silicone emulsifier conforming to the following structure:

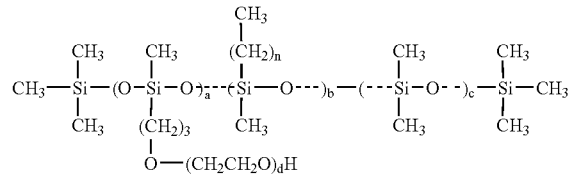

wherein;
a is an integer ranging from 2 to 10;
b is an integer ranging from 2 to 10, such that b/a>or=1, but less than 2.5;
c is (a+b) times x, wherein x is 1.5 to 2.5;
d is an integer ranging from 6 to 12;
are used to obtain the desired W/O (water/oil) type emulsion.

7 Claims, No Drawings

WATER IN OIL EMULSIONS

BACKGROUND OF THE INVENTION

1. Field of the Invention

The invention relates to emulsions having outstanding stability and reproducibility batch to batch, made using specific emulsifiers and oils selected from silicone oil and mineral oil or combinations thereof. The emulsions of the present invention are of the W/O (water/oil) type.

2. Description of the Prior Art

For the preparation of emulsions of the W/O type, emulsifiers are used which preferably are soluble or dispersible in oil and whose HLB value generally is less than 5. Such emulsifiers are normally used in an amount of 10 to 20 weight percent, based on the weight of the oily phase. Examples of such W/O emulsifiers include the fatty acid esters of glycerin, polyglycerin, sorbitol or wool wax alcohols. As the fatty acid component, oleic acid or isostearic acid is generally used.

According to the state of the art, special difficulties arise in the preparation of water/oil emulsions whose oily phase consists partly or completely of silicone oil. Conventional emulsifiers based on polyol esters of fatty acids do not produce satisfactory emulsions with silicone oils. Special formulations have to be worked out in each case for particular problems.

For example, U.S. Pat. No. 4,268,499, page 1, line 6, discloses antiperspirant preparations in the form of W/O emulsions which consist of:

(a) 30-60 parts by weight of an aqueous solution of an astringent, e.g., aluminum chloride, as a discontinuous phase;

(b) 27-67.5 parts by weight of a volatile liquid with a boiling point below 250.degree. C., e.g., a cyclic dimethylsiloxane;

(c) 0.5-3 parts by weight of a W/O emulsifier with an HLB value of 2 to 10;

(d) 1-5 parts by weight polyoxyalkylene-polysiloxane copolymer; and (e) 1-5 parts by weight of an O/W emulsifier with an HLB value of 11 to 17;

wherein components (a) to (e) add up to 100 parts by weight.

Furthermore, for the preparation of W/O emulsions whose oily phase consist of silicone oil or contain this oil in a predominant amount, emulsifiers are commercially obtainable which consist of a solution of polyoxyalkylene-polysiloxane copolymers in a cyclic siloxane. These products are, however, not satisfactory in all respects. The W/O preparations must be storage stable in order to ensure an adequate shelf life and a constant product quality. The emulsions must maintain a constant consistency over a period of several months, and neither oil nor water may separate out. This storage stability must, moreover be maintained at temperatures ranging from −5° C. to +40° C. There are, however, still particular difficulties with preparing stable W/O emulsions having silicone oils as the oily, continuous phase, wherein the silicone content is higher than 20 weight percent and preferably, higher than 30 weight percent, based on the total weight of the emulsion, and/or which contain, in addition to the silicone oil, other oily substances, such as, paraffin oils, ester oils or liquid or solid waxes, such as, vegetable, animal or mineral waxes. The W/O emulsions prepared from such mixtures of silicone oil and carbon-based organic oils using emulsifiers of the state of the art, generally show inadequate emulsion stability and break within hours or days. Even the preparation of a briefly stable emulsion is frequently impossible.

Copolymers are known in which polyoxyalkylene groups, as well as long-chain hydrocarbon groups are linked to a linear polysiloxane. The synthesis of such compounds is described in U.S. Pat. Nos. 3,234,252, 4,047,958, 3,427,271 and 2,846,458. The synthesis is preferably accomplished by adding an olefin with, for example, 6 to 18 carbon atoms, and a polyoxyalkylene ether of an olefinically unsaturated alcohol, e.g., the polyoxyalkylene ether of allyl alcohol, to a polydiorganosiloxane having SiH groups, the addition being carried out in the presence of a catalyst containing platinum.

According to U.S. Pat. No. 4,381,241, these copolymers can be used as emulsifiers for the preparation of W/O emulsion of salt solutions in liquid hydrocarbons, which can be used as drilling liquids. There is no indication, however, that such compounds could be suitable for the preparation of W/O emulsions, the oily phase of which consists of silicone oil and, optionally, of other carbon-based organic oils or waxes.

U.S. Pat. No. 4,698,178, issued Oct. 7, 1987, incorporated herein by reference, is perhaps the most significant in the art of preparing water in oil emulsions. This patent, now expired, teaches that specific silicone emulsifiers can be used to improve the stability of water in oil emulsions. Silicone emulsifiers of the type disclosed in the '178 patent are alkyl dimethicone copolyols. The patent claims specific ranges of polyoxyalkylene oxide moiety in the compound. The so called "p" value has a proviso that the molecular weight of that group range from 250 to 2,000 molecular weight. The emulsifiers suggested by this application, while an advance, result in products that can separate upon standing, resulting in batch to batch variation in the preparation of emulsions.

SUMMARY OF THE INVENTION

We have discovered that by selecting the proper emulsifier, the ability to make reproducible water/oil emulsions is significantly improved.

The present invention is directed toward a water in oil emulsion which comprises:

a. a silicone emulsifier conforming to the following structure:

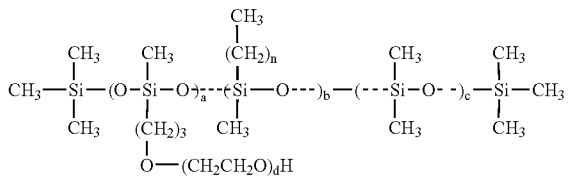

wherein;

a is an integer ranging from 2 to 10;

b is an integer ranging from 2 to 10 such that b/a>or=1, but less than 2.5;

c is (a+b) times x, wherein x is 1.5 to 2.5;

d is an integer ranging from 6 to 12;

n is an integer ranging from 9 to 15;

b. an oil phase selected from the group consisting of silicone fluid conforming to the following structure;

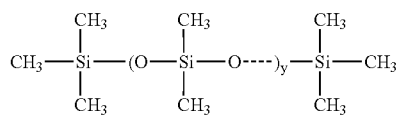

wherein;

y is an integer ranging from 2 to 2,000;

and hydrocarbon conforming to the following structure:

wherein z is an integer ranging from 20 to 60;

and (c) water.

Critical to the performance is the storage stable silicone emulsifier conforming to the following structure:

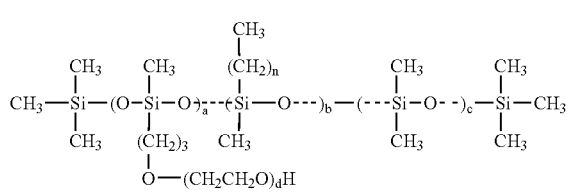

wherein;

a is an integer ranging from 2 to 10;

b is an integer ranging from 2 to 10 such that b/a>or=1, but less than 2.5;

c is (a+b) times x, wherein x is 1.5 to 2.5;

d is an integer ranging from 6 to 12;

n is an integer ranging from 9 to 15.

The prior art compounds did not recognize that the ratio of the sum of the number of water soluble groups (a) and number of alkyl soluble groups (b) to silicone soluble group (c) is critical to performance. Specifically, when the b value is related to the "a" value such that b/a>or=1, but less than 2.5, a clear homogeneous emulsifier results that does not settle with time. When attaching polyether and alkyl groups to a molecule through hydrosilation, the groups attach in a random fashion. So although a silicone backbone may have ten molar reactive sights to hydrosilate with (SiH groups), if you react 2 molar ratio of polyether groups and eight alkyls (where b/a is >2.5), they will attach in a random fashion, and statistically you may end up with a product that may have only alkyl groups attached and no polyether groups. Therefore, you will end up with some molecules which contain only alkyl groups and no polyether groups and will not act as an emulsifier. As well, in hydrosilation reactions, excess of polyether or alkyl monomers must be used to get the reaction to completion. If excess polyether is used, any unreacted polyether will be insoluble in the corresponding fluid where b/a>2.5, and can haze out and over time and form a separate phase, which can again alter the performance of the product in making emulsions. This separation causes major problems in the preparation of reproducible emulsions. The separation occurs in the drums containing product, and if the product is not warmed and agitated can result in addition of an emulsifier layer that is very different from the warm agitated emulsifier. This results in the inability to get good batch to batch emulsions. We have surprisingly found that by selection of the correct ratio of compounds an emulsifier that provides outstanding batch to batch consistency is produced.

DESCRIPTION OF THE PREFERRED EMBODIMENT

Examples

The compounds of the present invention conform to the following structure:

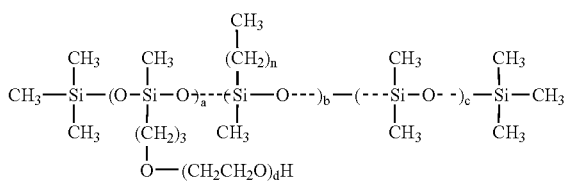

The "a" section of the molecule comes from the reaction of a silanic hydrogen containing polymer with an allyl alcohol alkoxylate.

The "b" section of the molecule comes from the reaction of a silanic hydrogen containing polymer with an alpha olefin.

Reaction Sequence

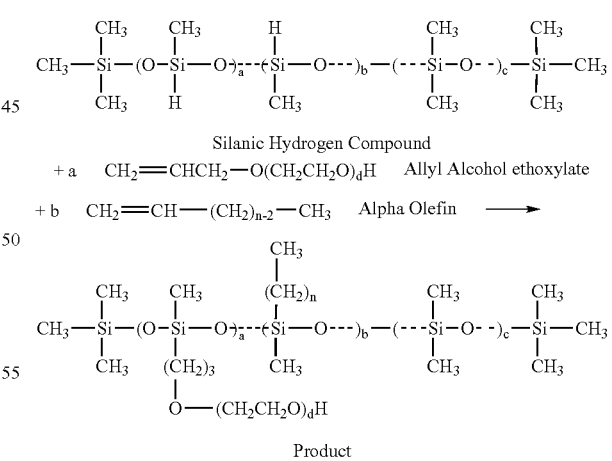

Examples

Silanic Hydrogen Compounds

Silanic hydrogen compounds are commercially available from Siltech Corporation in Toronto Canada and conform to the following structure:

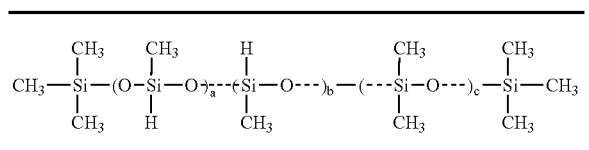

| Example | a | b | c |
|---------|---|----|----|
| 1 | 5 | 5 | 20 |
| 2 | 8 | 12 | 40 |
| 3 | 3 | 7 | 25 |
| 4 | 6 | 6 | 25 |
| 5 | 5 | 10 | 30 |

Alpha Olefin

Alpha olefin compounds are available from a variety of sources including Chevron Chemical and conform to the following structure:

$$CH_2=CH-(CH_2)_{n-2}-CH_3$$

| Example | n Valuce |
|---------|----------|
| 6 | 9 |
| 7 | 11 |
| 8 | 13 |
| 9 | 15 |

Allyl Alcohol Ethoxylate

The allyl alcohol ethoxylate useful in the preparation of the compounds of the present invention are commercially available from a variety of sources and conform to the following structure;

$$CH_2=CHCH_2-O(CH_2CH_2O)_dH$$

| Example | d |
|---------|---|
| 10 | 6 |
| 11 | 8 |
| 12 | 10 |
| 13 | 12 |

Alkyl Dimethicone Compounds

In a 5 liter flask equipped with thermometer, nitrogen inlet, reflux condensor and mechanical stirrer, is added the specified number of grams of the specified Silanic hydrogen compound (Examples 1-5), next add the specified number of grams of the specified alpha olefin (Examples 6-9) and the specified number of grams of the specified allyl alcohol ethoxylate (Examples 10-13), finally add 800 grams of isopropanol. Heat to 80° C. Add 0.008 grams of Karstedt catalyst while at 80 C. The reaction was run at 80 C while monitoring the SiH group at 80° C. by use of IR. When the SiH group becomes vanishingly small, the IPA is stripped off using vacuum. The final product is the silicone compound of the present invention and is used without additional purification.

| Ex-ample | Silanic Hydrogen | | Alpha Olefin | | Allyl Alcohol Ethoxylate | |
|---------|------|------|------|------|------|------|
| | Example | Grams | Example | Grams | Example | Grams |
| 14 | 1 | 2123.0 | 6 | 141.0 | 10 | 321.0 |
| 15 | 2 | 4108.0 | 7 | 169.0 | 11 | 409.0 |

| Ex-ample | Silanic Hydrogen | | Alpha Olefin | | Allyl Alcohol Ethoxylate | |
|---------|------|------|------|------|------|------|
| | Example | Grams | Example | Grams | Example | Grams |
| 16 | 3 | 2483.0 | 8 | 197.0 | 12 | 497.0 |
| 17 | 4 | 2596.0 | 9 | 225.0 | 13 | 585.0 |
| 18 | 5 | 3120.0 | 6 | 141.0 | 10 | 321.0 |

Oil Phases

Silicone Compounds:

Silicone compounds useful as oil phases are commercially available and conform to the following structure;

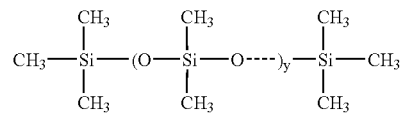

wherein;

y is an integer ranging from 2 to 2,000;

| Example | y |
|---------|---|
| 19 | 2 |
| 20 | 5 |
| 21 | 100 |
| 22 | 1000 |
| 23 | 2000 |

Hydrocarbons

The hydrocarbons useful in the current invention are commercially available from a variety of sources, including the Penreco division of Penzoil. The hydrocarbon compounds conform to the following structure:

$$CH_3-(CH_2)_z-CH_3$$

wherein z is an integer ranging from 20 to 60;

| Example | z |
|---------|---|
| 24 | 20 |
| 25 | 40 |
| 26 | 50 |
| 27 | 60 |

Emulsion—General Procedure

The preparation of the desired W/O emulsion is accomplished by adding the products of the present invention (Examples 14-18) to the specified number of grams of the specified oil with good mixing. Next the water is added slowly with good mixing. The resulting milky white product was passed through a Matin Gaulin homogenizer at 2,000 psi pressure.

The W/O emulsions obtained with the copolymers of the present invention have the required high stability and maintain this over a wide temperature range and at relatively low emulsifier concentrations. As a result of the low emulsifier content, the properties of the oily phase are accordingly only slightly affected by the emulsifier. This is particularly important for cosmetic or pharmaceutical applications. The W/O emulsions prepared with the inventive emulsifiers are also suitable for technical purposes, for example, for use as preservatives and polishes for furniture, lacquered metal or floors.

Emulsions

|  | Emulsifier | | Oil | | Water |
|---|---|---|---|---|---|
| Example | Example | Grams | Example | Grams | Grams |
| 28 | 14 | 1.0 | 24 | 40.0 | 59.0 |
| 29 | 15 | 2.0 | 25 | 40.0 | 58.0 |
| 30 | 16 | 4.0 | 26 | 60.0 | 36.0 |
| 31 | 17 | 3.0 | 27 | 60.0 | 37.0 |
| 32 | 18 | 3.0 | 25 | 70.0 | 27.0 |
| 33 | 14 | 5.0 | 19 | 65.0 | 30.0 |
| 34 | 15 | 3.0 | 20 | 85.0 | 12.0 |
| 35 | 16 | 5.0 | 21 | 67.0 | 28.0 |
| 36 | 17 | 1.0 | 22 | 60.0 | 39.0 |
| 37 | 18 | 2.5 | 23 | 70.0 | 27.5 |

Emulsion Stability

The stability of the emulsion was rated on a scale of 1-5, with 1 being an immediate split and 5 being stable longer than 48 hours.

| Example | Rating |
|---|---|
| 28 | 5 |
| 29 | 4 |
| 30 | 5 |
| 31 | 5 |
| 32 | 4 |
| 33 | 4 |
| 34 | 5 |
| 35 | 5 |
| 36 | 5 |
| 37 | 4 |

As can be easily seen from the above, the compounds of the present invention are outstanding emulsifiers for making water in oil emulsions. All emulsifiers (examples 28-37) are clear, water colored products that remain homogeneous at 20° C., with on separation or flock.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

We claim:

1. A water in oil emulsion, which comprises:

A. a silicone emulsifier conforming to the following structure:

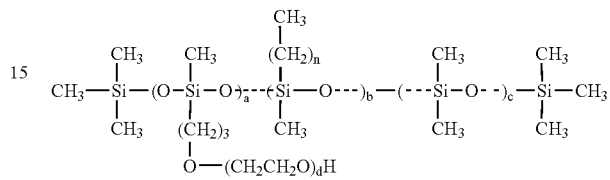

wherein;
a is an integer ranging from 2 to 10;
b is an integer ranging from 2 to 10 such that b/a>or=1, but less than 2.5;
c is (a+b) times x, wherein x is 1.5 to 2.5;
d is an integer ranging from 6 to 12;
n is an integer ranging from 9 to 15;

B. an oil phases selected from the group consisting of silicone fluid conforming to the following structure;

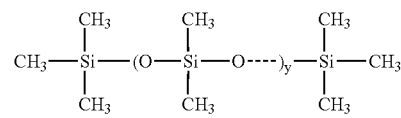

wherein;
y is an integer ranging from 2 to 2,000;
and hydrocarbon conforming to the following structure:

wherein
z is an integer ranging from 20 to 60;
and

C. water;

wherein the concentration of the silicone emulsifier ranges from 1% to 5% by weight, the concentration of the oil phase ranges from 40% to 85% and the concentration of water ranges from 59.5% to 12% by weight.

2. A water in oil emulsion of claim 1 wherein n is 11.

3. A water in oil emulsion of claim 2 wherein said oil phase is a silicone fluid.

4. A water in oil emulsion of claim 2 wherein said oil phase is a hydrocarbon.

5. A water in oil emulsion of claim 1 wherein n is 15.

6. A water in oil emulsion of claim 5 wherein said oil phase is a silicone fluid.

7. A water in oil emulsion of claim 5 wherein said oil phase is a hydrocarbon.

* * * * *